Figure 1:
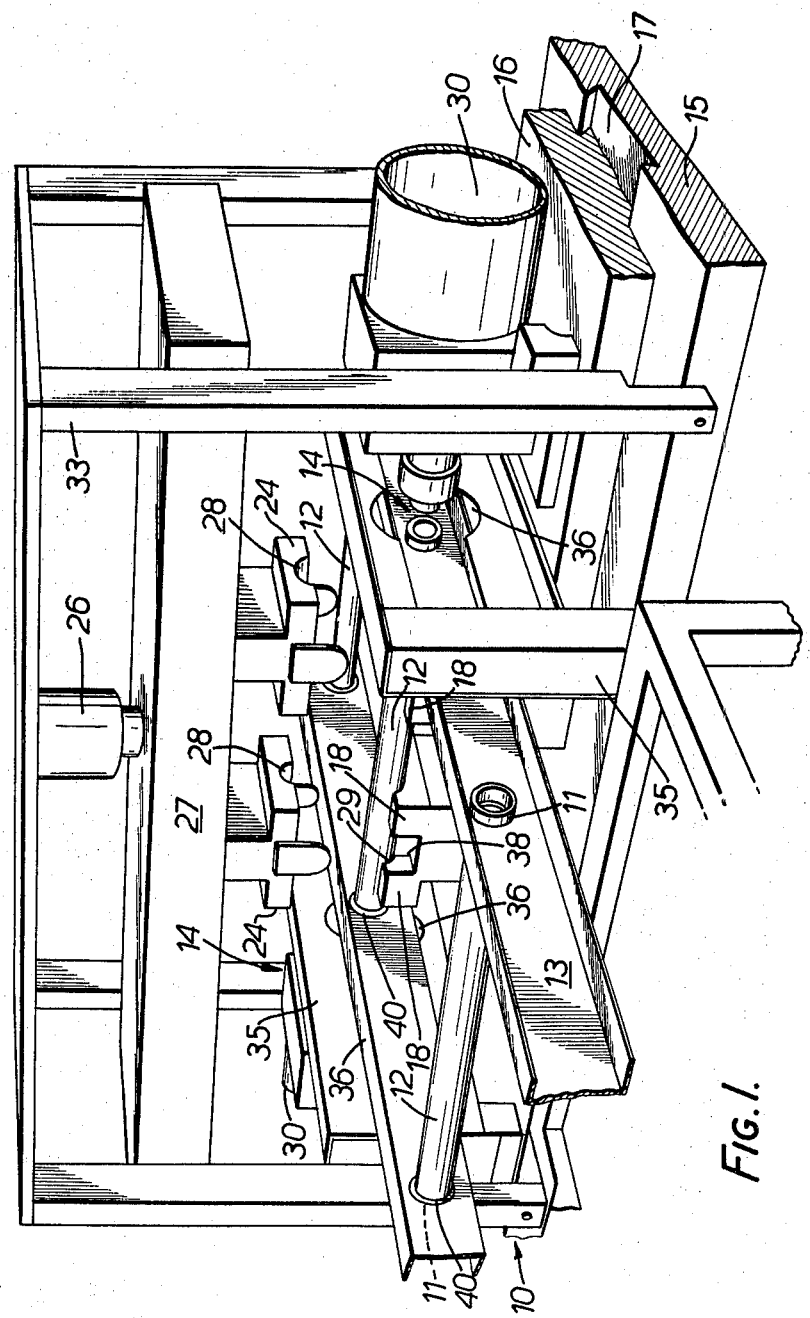

United States Patent [19]

Bailey

[11] 4,293,991
[45] Oct. 13, 1981

[54] APPARATUS FOR ASSEMBLING LADDER-TYPE FRAMES

[76] Inventor: William Bailey, P.O. Box 73, Acacia Ridge 4110, Qld., Australia

[21] Appl. No.: 76,086

[22] Filed: Sep. 17, 1979

[51] Int. Cl.³ .............................................. B23P 11/00
[52] U.S. Cl. .................................. 29/243.52; 29/252; 29/283.5
[58] Field of Search ............... 29/243.5, 243.52, 283.5, 29/252, 523, 512, 251; 182/228

[56] References Cited

U.S. PATENT DOCUMENTS

| | | | |
|---|---|---|---|
| 3,140,540 | 7/1964 | Greenman | 29/512 |
| 3,354,987 | 11/1967 | Werner et al. | 182/228 |
| 3,388,454 | 6/1968 | Willis | 29/523 |

*Primary Examiner*—Robert C. Watson

[57] ABSTRACT

This invention resides in an apparatus for assembling frames of the type having transverse members extending between side members and connected thereto at each end by a compression joint. The apparatus includes a main support frame for supporting a pair of connection forming assemblies each adapted to co-operate with an end if the transverse member adjacent a respective side member. Each connection assembly includes a pair of co-operating compressing members adapted to be operatively located at either side of the respective side member and being movable towards one another and across the support frame to co-operate with the respective end to form the compression joint.

19 Claims, 2 Drawing Figures

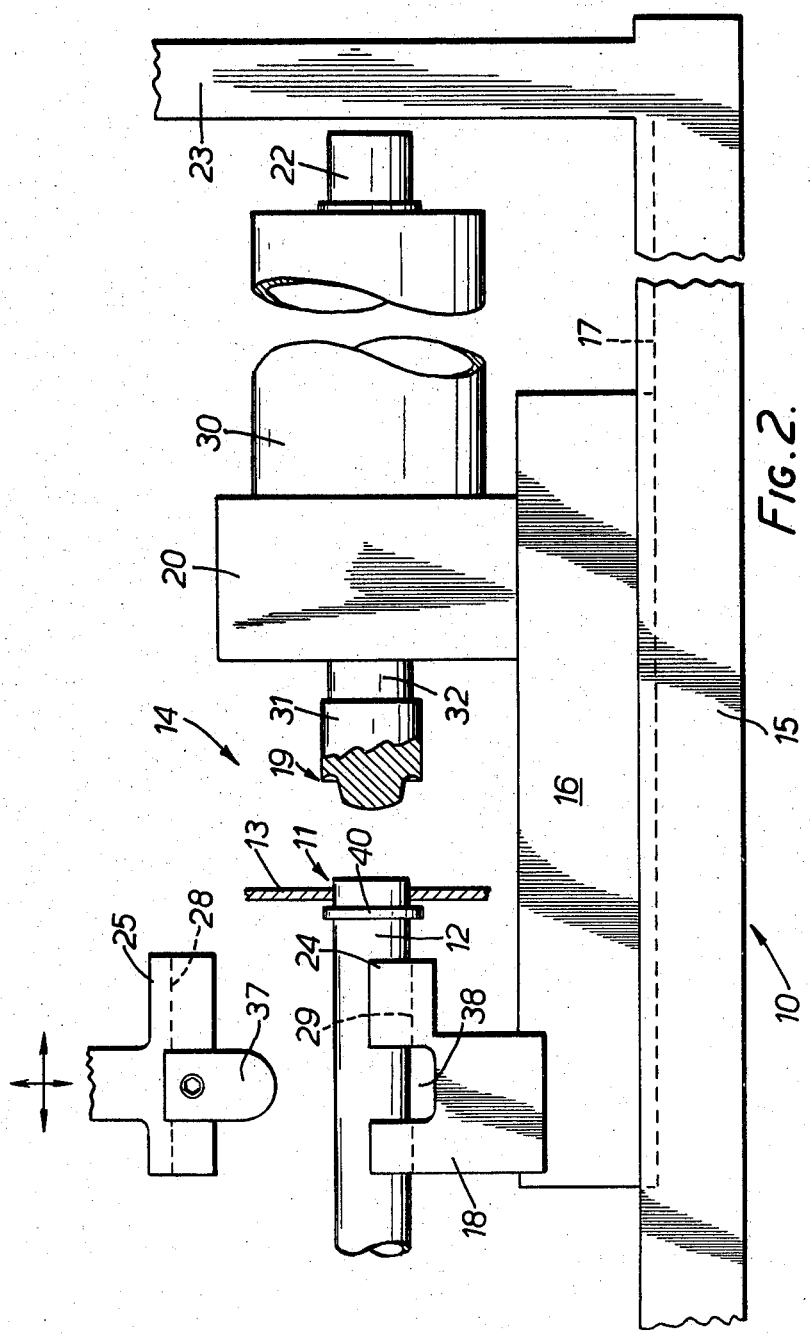

APPARATUS FOR ASSEMBLING LADDER-TYPE FRAMES

This invention relates to apparatus for assembling ladder-type frames and in particular it relates to apparatus for assembling metal ladders.

Ladders fabricated from aluminium components are very common. These normally comprise tubular aluminium transverse members or rungs which extend between aluminium channel-shaped side members or stiles. The rungs are adapted to pass through spaced apertures in the stiles and are provided with annular flanges inwardly of each end and which abut against the inside face of the stiles. The end portions of the rungs may be swaged to clamp the stiles against the annular flange, or form flanged end plugs may be forced through spaced apertures in the side stile into the tubular rung. The interference fit between the plug and the rung provide the necessary connection. These and other like joints are hereinafter referred to as compression joints. Other end connections are also used and various rung configurations are used depending on the intended application of the ladder or frame.

While most ladders are made to a relatively standard width, the overall width does vary. The present apparatus used to effect the compression joint connections between the stiles and the rungs is manually controlled and most often includes a fixed anvil and a movable plunger for applying the pressure for either the swaging or other connection operation. For speed of production, such apparatus are usually adapted to effect the opposite end connection simultaneously, and accordingly, because of the use of fixed spaced anvils the apparatus has to be set up to suit the width of the particular ladder or frame being produced. After the apparatus has been set up for a particular frame width, it is not suitable for use with similar frames having a different overall width. Furthermore, such apparatus cannot be easily modified to suit different end connection arrangements, or side rails and rungs having different cross-sectional configurations.

Accordingly, it is an object of the present invention to provide apparatus for assembling ladder-type frames which will overcome the above disadvantages and which will prove reliable and efficient in operation. Other objects and advantages of the invention will become apparent from the following description.

With the foregoing and other objects in view, this invention resides broadly in apparatus for assembling frames of the type having transverse members extending between side members and connected thereto at each end by a compression joint, said apparatus including a main support frame for supporting a pair of connection forming assemblies each adapted to co-operate with an end of said transverse member adjacent a respective said side member, each said connection assembly including a pair of co-operating compressing means adapted to be operatively located at either side of the respective side member and being movable towards one another and across said support frame to co-operate with the respective said end to form said compression joint.

In order that the invention may be more readily understood and put into practical effect, reference will now be made to the accompanying drawings which illustrate one embodiment of the invention and wherein:

FIG. 1 is a perspective view of the operative portion of one form of swaging apparatus made in accordance with the present invention, and FIG. 2 is a diagrammatic view of an end portion of the swaging apparatus illustrated in FIG. 1.

The swaging apparatus 10 of this invention is adapted to form a swage connection between the end 11 of each rung 12 and the respective web 13 of each ladder stile. The drawings in FIG. 2 illustrate only one swaging assembly 14 of a pair of swaging assemblies supported on the common fixed base 15 and at opposite ends thereof, for simultaneously forming the end swage connections between each ladder rung 12 and stiles 13. Each swaging assembly 14 is fitted on to one of a pair of sliding base plates 16 each of which is slidable along the fixed base 15 in the guide slot 17 formed therein and extending longitudinally therealong. Each plate 16 supports at its inner end the respective lower anvil head 18 each of which has in its upper face a semi-circular groove 9 in which a ladder rung 12 may be located.

Each anvil head 18 is associated with an upper crimping head 25 which is recessed at 28 on its under side and which is supported on a common top plate 27 which is adapted to be moved in the vertical direction by the hydraulic ram 26 from an upper position to its lower crimping position and each respective upper crimping head 25 co-operates with the respective lower anvil head 18 to clamp the rung 12 between. Each crimping head 25 is mounted for slidable movement along the top plate 27 and is provided with opposite side lugs 37 which are adapted to register with the side cut-outs 38 in the lower anvil head 18, whereby the upper crimping heads when disposed in their operative position will move longitudinally along the rung 12 with the lower anvil heads 18.

A co-operating swaging head assembly 19 having a swaging tool 31 fixed removably to the plunger shaft 32 of a hydraulic ram 30 is mounted in the support housing 20 which is fixed to the sliding base plate 16. The shaft 32 passes through the cylinder of the ram 30 and is provided with an extension piece 22 movable therewith. This extension piece 22 is adapted to co-operate in a manner, which will be hereinafter apparent, with a fixed back-stop member 23 mounted rigidly on to the fixed base 15. The hydraulic ram 26 is supported on the upper portion of the fixed main frame and extends between the posts 33 fixed to the base plate 15.

In use, the ladder is adapted to be assembled with components comprising apertured stiles and rungs having annular flanges adjacent each end. These components are arranged with the rungs between the stiles and with their respective flanges abutting against the inner faces of the stiles. Thus assembled ladders are fed into the apparatus 10 on the support rails 34 and between the side gate frame assemblies 35 which are provided with cut-outs 36 for the swaging tools 31. The ladder is adapted to be advanced one step at a time to place each rung to be swaged into the recesses 29 of the lower spaced anvil heads 18. The oppositely disposed hydraulic ram assembly 30 and the top plate actuating ram 26 which are interconnected are adapted to be actuated to urge the swaging tools 31 inwards towards the free end 11 of the operatively located rungs 12 and the crimping heads 25 downwardly to co-operate with the lower anvil cut-outs 38.

The hydraulic ram assemblies are interconnected and are fed from the same oil supply and are thus maintained at the same pressure. When the oil pump (not shown)

has been actuated, each crimping head 25 and each swaging tool 31 will move towards its operative position. After the crimping heads and the anvil tools have reached their operative position, further extension of the ram assemblies 30 will cause the respective sliding base plates 16 to move outwardly along the fixed base plate 15 moving therewith the crimping head assemblies 18 until each anvil face 24 abuts against the pre-formed annular flange 40 adjacent the end of each rung 12.

As previously mentioned, the hydraulic rams 26 and 30 are supplied from a common source so that pressure build-up will not occur in any one cylinder prior to the other so that each anvil face will be operatively located against the respective annular flange 40 prior to any swaging being applied by the respective swaging tool 31. Thus, the apparatus of the present invention is self-centering.

When both anvil faces 24 are urged against the annular flange 40 pressure build-up will occur within each hydraulic ram assembly causing the swaging tool 31 to swage the free end 11 of the rungs 12 about the web of the respective stiles 13 for secure retention therein. The swaging tools 31 are then retracted causing the rear extension members 22 to move outwardly until they contact the respective back-stop member 23 (only one of which is shown). Further extension will then cause the sliding base plates 16 to move inwardly towards each other moving therewith the anvil heads 18 and the crimping heads 25 away from the formed swage connection, enabling the swaged rung to be removed and the next rung to be supported for swaging operations.

Of course, the top ram 26 is supplied with oil from the common source and initial pressure will not cause sufficient clamping action between the crimping head and the anvil head to prevent their outward movement along the rung 12 until their respective anvil faces 24 are in abutting relationship with the annular flange 40. Thereafter, the hydraulic pressure will build up in the ram 26 to securely clamp them about the rung 12.

Preferably, the cycle of operations is automatically controlled for actuation as desired, and it is also preferred that feeding means be provided to advance the ladder stepwise into engagement with the swaging apparatus. The swaging tool may be replaced for forming plug-in type connections as previously described or other connections as desired, and the recesses in the anvil heads 18 and the crimping heads 25 may be varied to suit the shape of the rungs.

While the compression joints described in the preferred embodiment are formed by the "swaging process" the compression joint may be formed also by the "spinning process" and reference hereto to the compressing means includes a reference to swaging apparatus and spinning apparatus.

However, it will of course be realised that while the above has been given by way of illustrative example, the apparatus according to the present invention may be easily modified to incorporate separately controllable rams for the various functions. However, it is to be understood that all such and other obvious modifications as would be apparent to persons skilled in the art are deemed to fall within the broad scope and ambit of the invention as is defined in the appended claims.

I claim:

1. Apparatus for assembling frames of the type having transverse members extending between side members and connected thereto at each end by a compression joint, said apparatus including a main support frame for supporting a pair of connection-forming assemblies, each adapted to co-operate with an end of said transverse member adjacent a respective said side member, each said connection-forming assembly including compressing means located on the outside of said side member and adapted to co-operate with an anvil assembly located on the inside of said side member, said anvil assembly having two co-operating parts provided with complimentary recesses to receive said transverse members, one said part being fixed to a base plate slidably mounted on said support frame for movement in the direction parallel to said transverse members and wherein said compressing means is mounted on said base plate and movable with respect thereto whereby said anvil assembly and compressing means are movable towards one another and across said support frame to co-operate with the respective said end to form said compression joint.

2. Apparatus according to claim 1 wherein said compressing means is adapted to be actuated by a fluid actuated ram mounted on said base plate.

3. Apparatus according to claim 2 wherein said fluid actuated ram includes a shaft adapted to be operatively reciprocated in a direction parallel to said transverse members, and wherein said compressing means is supported at one end of said shaft.

4. Apparatus according to claim 3 wherein there is provided a back stop on said support frame adapted to co-operate with the end of said shaft remote from said compressing means, whereby when said compressing means is retracted from its operative compression attitude, said remote end will abut against said back stop and cause said anvil assembly to move parallel to said transverse members and away from said compression joint.

5. Apparatus according to claim 4 wherein each said transverse member is constituted by a tubular member provided with an annular flange adjacent each end and adapted to abut against the respective inside faces of said side members and wherein said anvil assembly parts are adapted to be disposed about said tubular member behind said annular flange to operatively support said tubular member for forming said compression joint.

6. Apparatus according to claim 5 wherein said compression jont comprises a swage joint.

7. Apparatus for assembling frames of the type having transverse members extending between side members and connected thereto at each end by a compression joint, said apparatus including a main support frame for supporting a pair of connection-forming assemblies, each adapted to co-operate with an end of said transverse member adjacent a respective said side member, each said connection-forming assembly including compressing means located on the outside of said side member and adapted to co-operate with an anvil assembly located on the inside of said side member, said anvil assembly having upper and lower parts provided with complimentary recesses to receive said transverse members, said lower part being fixed to a base plate slidably mounted on said support frame for movement in the direction parallel to said transverse members and said upper part being supported by a fluid actuated ram for movement in the vertical direction towards and away from said lower part and wherein said compressing means is mounted on said base plate and movable with respect thereto whereby said anvil assembly and compressing means are movable towards one another and across said support frame to co-operate with the respective said end to form said compression joint.

8. Apparatus according to claim 7 wherein said upper part is mounted on a top plate for sliding movement in a direction parallel to said transverse members whereby said upper part when engaged with said lower part may move towards and away from said side member with said lower part and wherein said top plate is moved towards and away from said lower part by said fluid actuated ram.

9. Apparatus according to claim 8 wherein said upper part includes lugs adapted to be engaged with cut-outs in said lower part whereby movement of said lower part towards and away from said side member causes corresponding movement of said upper part.

10. Apparatus according to claim 9 wherein said compressing means is adapted to be actuated by a further fluid actuated ram mounted on said base plate.

11. Apparatus according to claim 10, wherein said further fluid actuated ram includes a shaft adapted to be operatively reciprocated in a direction parallel to said transverse members, and wherein said compressing means is supported at one end of said shaft.

12. Apparatus according to claim 11 wherein there is provided a back stop on said support frame adapted to co-operate with the end of said shaft remote from said compressing means, whereby when said compressing means is retracted from its operative compression attitude, said remote end will abut against said back stop and cause said anvil assembly to move parallel to said transverse members and away from said compression joint.

13. Apparatus according to claim 12 wherein said fluid actuated rams for actuating said upper part and said compressing means are interconneted so as to be maintained during operation at substantially the same pressure.

14. Apparatus according to claim 13 wherein each said transverse member is constituted by a tubular member provided with an annular flange adjacent each end and adapted to abut against the respective inside faces of said side members and said anvil assembly parts are adapted to be disposed about said tubular member behind said annular flange to operatively support said tubular member for forming said compression joint.

15. Apparatus according to claim 14 wherein said compression joint comprises a swage joint.

16. Apparatus for assembling frames of the type having transverse members extending between side members and connected thereto at each end by a compression joint, said apparatus including a main support frame for supporting a pair of connection-forming assemblies, each adapted to co-operate with an end of said transverse member adjacent a respective said side member, each said connection-forming assembly including compressing means located on the outside of said side member and adapted to co-operate with an anvil assembly located on the inside of said side member, said apparatus further including a base plate associated with each said connection forming assembly and slidably mounted on said support frame for movement in the direction parallel to said transverse members, said anvil assembly being mounted for movement with said base plate and said compressing means being mounted on and movable with respect to said base plate whereby said anvil assembly and compressing means are movable towards one another and across said support frame to co-operate with the respective said end to form said compression joint.

17. Apparatus according to claim 16 wherein said compressing means is adapted to be actuated by a fluid actuated ram mounted on said base plate.

18. Apparatus according to claim 17 wherein said fluid actuated ram includes a shaft adapted to be operatively reciprocated in a direction parallel to said transverse members, and wherein said compressing means is supported at one end of said shaft.

19. Apparatus according to claim 18, wherein there is provided a back stop on said support frame adapted to co-operate with the end of said shaft remote from said compressing means, whereby when said compressing means is retracted from its operative compression attitude, said remote end will abut against said back stop and cause said anvil assembly to move parallel to said transverse members and away from said compression joint.

* * * * *